United States Patent
Kravitz

(10) Patent No.: US 8,665,618 B2
(45) Date of Patent: Mar. 4, 2014

(54) PASSIVE THREE PHASE INPUT CURRENT HARMONIC REDUCTION AND POWER FACTOR CORRECTION CIRCUIT FOR POWER SUPPLIES

(75) Inventor: Melvin Kravitz, Port Jefferson, NY (US)

(73) Assignee: Switching Power, Inc., Ronkonkoma, NY (US)

( * ) Notice: Subject to any disclaimer, the term of this patent is extended or adjusted under 35 U.S.C. 154(b) by 435 days.

(21) Appl. No.: 13/036,911

(22) Filed: Feb. 28, 2011

(65) Prior Publication Data

US 2012/0008355 A1  Jan. 12, 2012

Related U.S. Application Data

(60) Provisional application No. 61/362,559, filed on Jul. 8, 2010.

(51) Int. Cl.
*H02M 1/12* (2006.01)
*H02M 1/14* (2006.01)

(52) U.S. Cl.
USPC .......................................................... 363/44

(58) Field of Classification Search
USPC ................................. 363/39, 44–48
See application file for complete search history.

(56) References Cited

U.S. PATENT DOCUMENTS

| | | |
|---|---|---|
| 2,367,625 A | 1/1945 | Short |
| 4,119,907 A | 10/1978 | Quinn |
| 4,212,096 A | 7/1980 | Saito et al. |
| 4,222,096 A | 9/1980 | Capewell |
| 4,369,490 A * | 1/1983 | Blum ............................. 363/48 |
| 4,672,522 A | 6/1987 | Lesea |
| 4,677,366 A | 6/1987 | Wilkinson et al. |
| 4,683,529 A * | 7/1987 | Bucher, II ....................... 363/44 |
| 4,795,959 A | 1/1989 | Cooper |
| 4,914,559 A | 4/1990 | Deisch |
| 4,930,061 A | 5/1990 | Slack et al. |
| 4,959,766 A | 9/1990 | Jain |
| 4,961,044 A | 10/1990 | Kravitz |
| 5,148,359 A | 9/1992 | Nguyen |
| 5,994,869 A * | 11/1999 | Becerra ......................... 363/36 |
| 8,094,472 B2 * | 1/2012 | Chang et al. .................... 363/80 |
| 2003/0043607 A1 * | 3/2003 | Vinciarelli et al. ............. 363/61 |
| 2006/0187693 A1 * | 8/2006 | Tang ............................. 363/126 |

OTHER PUBLICATIONS

Tanju et al., May 1994, IEEE, Trans. on Power Electronics vol. 9 No. 3, 275-280.*
Bedford et al., "Principles of Inverter Circuits," Chapter 5, Series Capacitor-Commutated Inverters; John Wiley & Sons, Inc., New York-London-Sydney, Dec. 23, 1964; pp. 128-131.

* cited by examiner

Primary Examiner — Jue Zhang
(74) Attorney, Agent, or Firm — Scully, Scott, Murphy & Presser, P.C.

(57) ABSTRACT

A harmonic input current reduction and power factor correction circuit for three phase, power supplies. The circuit includes passive elements including a series inductance and capacitor connected between each AC line of a three phase voltage source, and each input phase of the uncorrected power supply. The inductance and capacitor are designed and chosen to meet linearity and volt ampere requirements to achieve total harmonic current levels of less than 10%, and power factors greater than 0.98. This is achieved with less than 1% loss in line operating input voltage range and overall efficiency of greater than 99.5%. Further, the dynamic response of a circuit to power supply load transient demands is limited in voltage overshoot or undershoot effects.

17 Claims, 4 Drawing Sheets

PASSIVE THREE PHASE INPUT CURRENT HARMONIC REDUCTION AND POWER FACTOR CORRECTION CIRCUIT FOR POWER SUPPLIES

CROSS-REFERENCE TO RELATED APPLICATIONS

This disclosure relates to and claims the benefit of the filing date of commonly-owned, U.S. Provisional Patent Application No. 61/362,559, filed Jul. 8, 2010, the entire contents and disclosure of which is incorporated by reference as if fully set forth herein.

FIELD OF THE INVENTION

The present invention relates to regulated DC power supplies generally, and specifically, an apparatus and circuit for reducing current at harmonic frequencies while increasing power factor correction for DC supplies.

BACKGROUND

FIG. 1 illustrates is a schematic diagram of a conventional uncorrected switching regulator power supply 10 which converts unregulated AC high voltage from an AC power line to regulated DC low voltage for powering circuitry in electronic equipment such as computer terminals, radar transmitters, machine tools, motors, and controllers.

The uncorrected switching regulator power supply 10 shown in FIG. 1 includes a full wave rectifier component 15 adapted to receive the 3 phase 120/240/480V, 50/60 HZ power line voltage. The rectifier input is connected to a filter 17, capacitor filter, in turn, this is coupled to a DC to DC inverter circuit 20. The inverter 20 supplies a transformer 25 having a primary winding N1 and a secondary winding N2. The electrical output waveform 50, referred to as $E_o$, at the secondary of the transformer, is shown. This waveform 50 is applied to a low pass filter 60 constituting the output circuit of power supply 10, comprising inductance Lo and output capacitance Co.

The AC line voltage is full wave rectified by rectifier 15, and filtered by 17, resulting in a high voltage unregulated DC bus voltage at the output of the rectifier. This filtered voltage is applied to the inverter circuit 20. The latter is a DC to DC inverter which typically operates from 20 to 500 KHZ, and a control circuit provides pulse width modulation to the switching devices for control of the output 75 DC level. The DC output component 75 of the input waveform from the AC power line is the output voltage of the low pass filter circuit 60 (and, thus, of power supply 10), it is the ratio of the width of each pulse ($t_{on}$) to a full cycle (T) of the train multiplied by the pulse amplitude, or mathematically as shown in FIG. 1: Output voltage=$(t_{on}/T)(N_2/N_1)*E_{DC}$ where $t_{on}$ is pulse width; T is pulse cycle time; N 1 and N 2 are the number of windings on the primary and secondary, respectively, of the transformer; and $E_{DC}$ is the DC level of the rectified AC input voltage to the power supply across capacitor 17.

As shown in the plot of FIG. 2, the amplitude of the input current waveform 80 consists of a periodic series of quasi sinusoidal current pulses, each pulse corresponds to the conduction interval of the input voltage 12, full wave rectifier 15, capacitor 17 (as shown in FIG. 1). That is, the input current will flow whenever the input voltage per phase is greater than the capacitor voltage 17. As such the input current will contain intervals of zero 85 current and spike intervals of current 87. The resultant input current per phase is shown in FIG. 2.

As seen, this is rich in harmonic current levels and the total harmonic content can exceed 50%. Each phase input current will be the same as FIG. 2, shifted by 120 degrees in time.

This output voltage from power supply 10 is a suitable low voltage supply for any of a number of electronic equipment applications, such as computer systems, medical instrumentation, telephone switching systems, machine control systems, or other apparatus employing semiconductor devices, motors or integrated circuitry or that requires supply voltages.

The output voltage of the supply 10 is employed as the supply voltage for any device operating on DC power. The power supply efficiency is the ratio of power out to power in, and can be high—for example, greater than 80% for 150 volt outputs and greater than 75% for 48 volt outputs. The power factor, which is a measure of how well such a power supply utilizes the AC line voltage, however, is typically relatively low. A power factor of 0.70 is not unusual for supplies above 10,000 watts.

Low power factor is attributable to the fact that the input current drawn by the rectifier and filter capacitor of the power supply is not sinusoidal and is not in phase with the input voltage. For example, as shown in the plot of FIG. 2, one phase current 80 of the three phase line current drawn by the supply, from the source (e.g., a 7.5 KW power supply load, 480V AC/60 HZ operation), is drawn only in periodic pulses 87 to recharge the input capacitor. A power factor improvement can be realized by increasing the conduction angle φ, but this capability is limited by the ripple current rating of the input filter capacitor. For a typical conventional power supply with a conduction angle "φ" of ¼ of T/2 seconds, the demand is four times the RMS value of the input current.

As shown in the plot 80 of FIG. 2, the large peak current loading produces stress on the facility source, and may result in loss of peak AC voltage because of reactive and resistive regulation losses. It is not unusual to measure harmonic current values of greater than 50%. This far exceeds good design practice for AC loading of a source and generators in particular, for long life.

In a further example, a three phase power supply having a power factor of 0.75 draws 25% more input current than a comparable power supply having a unity power factor. For example, a conventional 7500 watt, 425 volt power supply operating with a 0.75 power factor off a 480 volt three-phase AC input line will draw 12 amps. The harmonic current content will exceed 50%. This harmonic current per phase is further detrimental if a neutral is present since harmonic currents will add on the return neutral connection.

The susceptibility of other loads to deterioration of performance is reduced in the presence of a power supply operating with the higher power factor, at least partly because harmonic current is substantially reduced or virtually eliminated.

It would be highly desirable to provide an improved regulated DC power supply with high efficiency of power conversion, reduction of line harmonic current and providing near unity power factor.

SUMMARY

In one embodiment, there is provided an improved regulated AC-DC power supply with high efficiency of power conversion, reduction of line harmonic current and providing near unity power factor.

Further, there is provided a regulated AC to DC converter having unity or near-unity power factor and relatively low input current demand.

Still further, there is provided an AC-DC power supply that achieves high power conversion efficiency without adversely affecting the operating line range.

Still yet further, there is provided a circuit for use with or addition to a regulated AC to DC power supply, that reduces and lowers harmonic input current, improve the power factor, conversion efficiency, and operating line range impact of the power supply.

According to one aspect, there is provided a passive power factor correction circuit for an AC to DC power supply that receives 3-phase current from a connected 3 phase AC power source, the power supply having respective inputs associated with phase, the correction circuit comprising: a linear inductor having an inductance and, a capacitor having a capacitance, with the inductor having a winding arranged and adapted for electrical connection in series with the capacitor, the circuit connecting each respective phase the source and a respective power supply input associated with each respective phase, the inductance in combination with the capacitance of values reducing odd harmonic frequency current components from the line current drawn by the power supply in response to a load being placed on the AC power source; and, the inductance in combination with the capacitance of values providing a resonant frequency of the circuit set below a lowest frequency of the AC power source.

According to a further aspect, there is provided an AC to DC power supply apparatus comprising: an AC to DC power supply that receives 3-phase current from a connected 3-phase AC power source and generates DC current output, the power supply having a respective input terminal associated with each phase for receiving line current of the phase; a power factor correction circuit associated with each respective phase, each the correction circuit including a linear inductor having an inductance and, a capacitor having a capacitance, with the inductor having a winding arranged and adapted for electrical connection in series with the capacitor, each the circuit connecting a respective AC source line current source of a respective phase and a respective power supply input terminal; the inductance in combination with the capacitance of values reducing odd harmonic frequency current components from the line current drawn by the power supply in response to a load being placed on the AC power source; and, the inductance in combination with the capacitance of values setting a resonant frequency of the circuit below a lowest frequency of the AC power source current.

Further to this aspect, the inductance and capacitance values are selected to provide low real power loss to the power supply line operation, while providing high impedance to harmonic currents otherwise present. In one embodiment, a high impedance is provided to odd harmonic frequencies currents of the power source.

Further to this aspect, the inductance and capacitance values are selected to provide low real power loss to the power supply line operation results in increased power factor while maintaining low voltage drop loss at the fundamental frequency current flow from the said three phase source to the power supply.

Further, harmonic current content at odd frequencies is reduced to less than 10% in the source current when in place with said power supply.

Further, while achieving reduction of harmonic current content at odd frequencies, there is exhibited improved power factor to 0.98, with loss of the power supply operating voltage range of less than 1%, while obtaining efficiency of better than 99.5%.

In addition, the characteristic impedance may be adjusted to achieve an overall critically or over damped transient response.

By implementing the circuit in the embodiments described, the source line current also experiences a line current phase shift on a cycle by cycle basis to greatly improve the source loading for power supply load transients often seen in certain types of radar power supplies.

BRIEF DESCRIPTION OF THE DRAWINGS

Other aspects, features and advantages of the present invention will become more fully apparent from the following detailed description, the appended claims, and the accompanying drawings in which similar elements are given similar reference numerals.

DETAILED DESCRIPTION

In one embodiment, there is provided an apparatus and circuit for improving the power factor of switching regulator or electronic voltage power supplies.

Particularly, according to a preferred embodiment, a circuit, alternately referred to herein as a harmonic current or power factor "correction circuit", includes a linear inductor and capacitor, the capacitor being electrically connected in series with the inductor, and an identical (repeating) circuit is placed in each phase between the source and the uncorrected power supply input.

Figure 3:
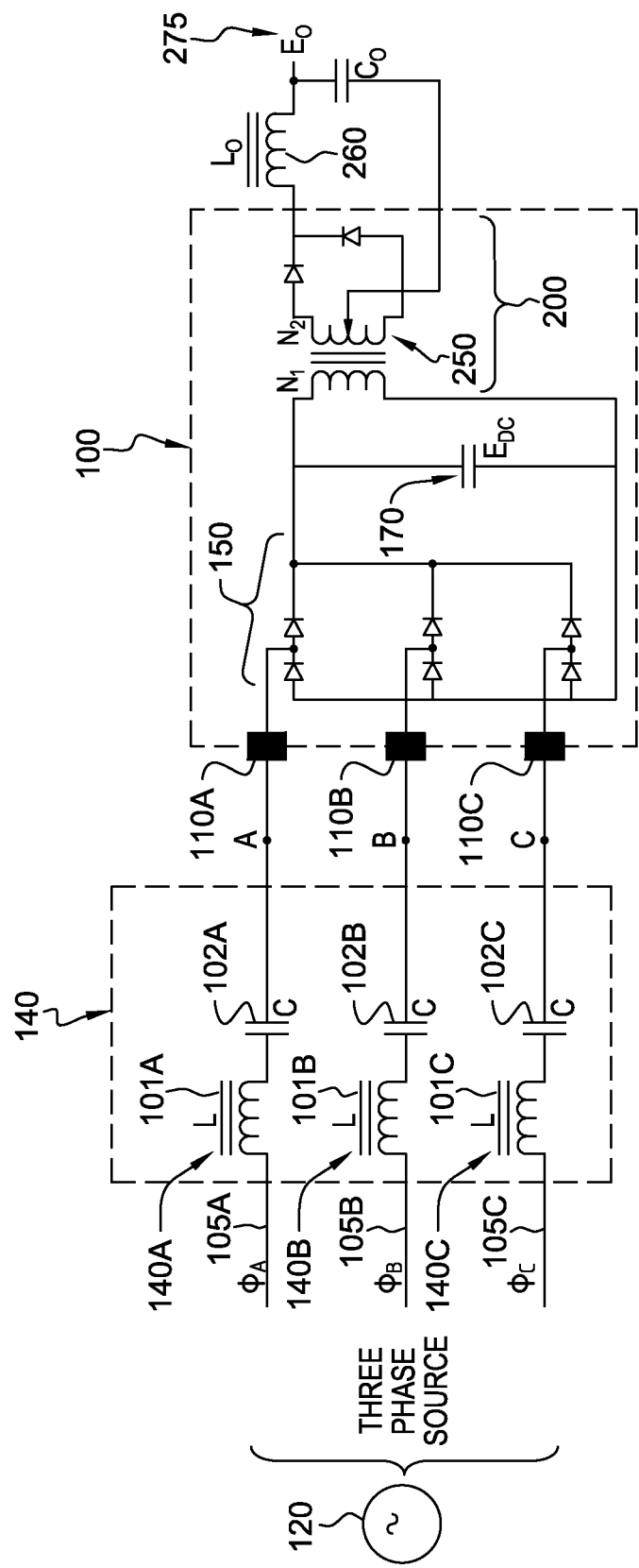
FIG. 3 illustrates the inventive harmonic current correction circuit 140 for a power supply 100 in accordance with one embodiment; and, FIG. 4 illustrates an example plot depicting a corrected input current waveform with harmonic current correction circuit situated between source and supply of the power supply shown in FIG. 3.

In view of FIG. 3, a circuit 140 is provided for enhancing power factor of a switched regulated electronic power supply 100.

Figure 1:
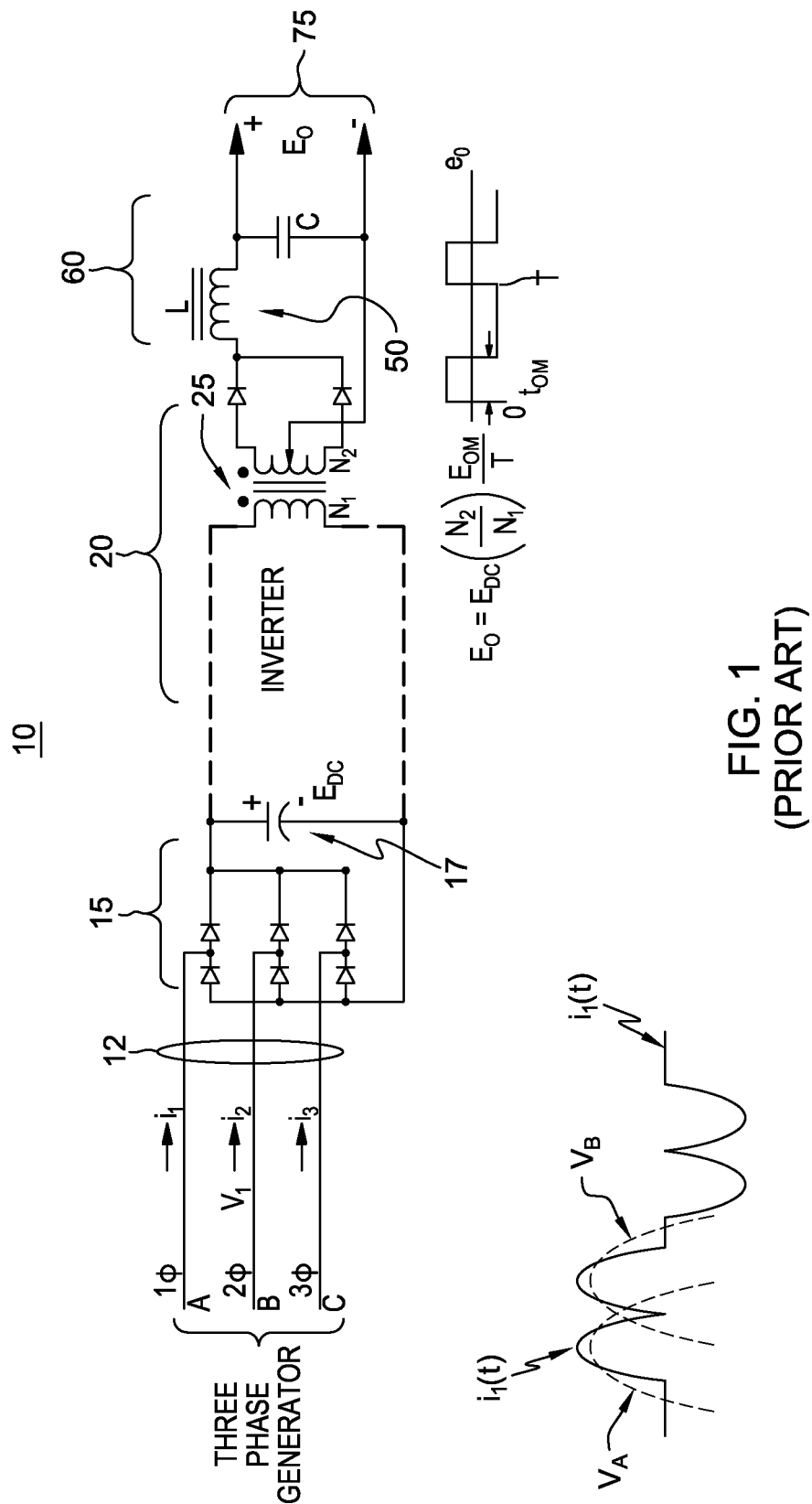
FIG. 1 illustrates an example circuit configuration of a conventional uncorrected power supply 10.
Figure 2:
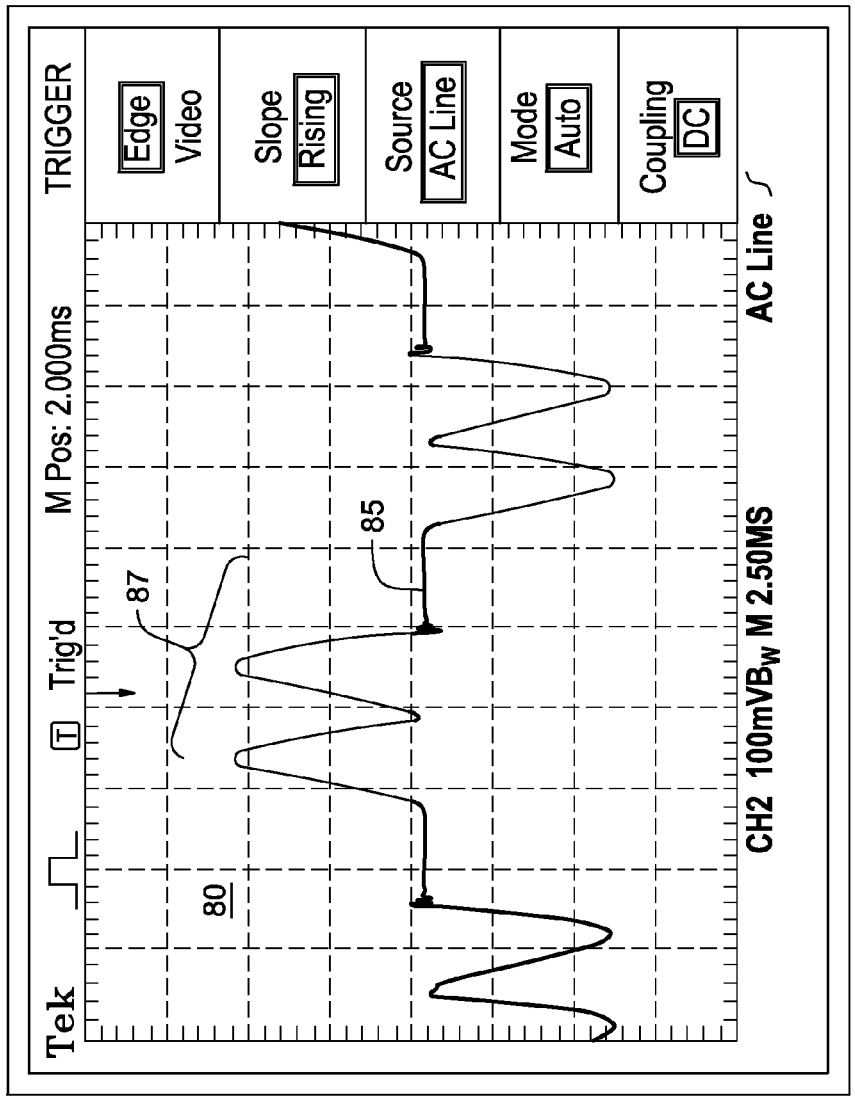
FIG. 2 illustrates an example plot depicting an input current waveform of any phase drawn by the conventional uncorrected power supply connected to the three phase source of FIG. 1.

In one embodiment, power supply 100 is similar to the embodiment of power supply 10 of FIG. 1 that converts a 3-phase alternating current AC signal from a source 120, e.g., a 3-phase power line, into a DC current. The source 120 may include, for example, a 3-phase generator output, having line current of respective phases $\phi_A$, $\phi_B$ and $\phi_C$, each 120° degrees apart at approximately from 57 to 63 HZ on respective voltage lines $105_A$, $105_B$, and $105_C$.

The embodiment shown in FIG. 3, includes connection of the power factor correction circuit 140 between each line $105_A$, $105_B$ and $105_C$ of a respective a 3-phase line source and respective terminals $110_{A,B,C}$ forming inputs of power supply 100 that receives the input line current of each phase, and presents an impedance to the AC signal source 120 for reducing harmonic current of each respective phase in the manner according to the embodiments described in greater detail herein below.

As further shown in FIG. 3, power supply inputs 110 of each phase are connected to rectifier component 150 that includes a number of diodes in a specific arrangement for converting received 3-phase AC current to a DC current which is fed through capacitor filter 170. The power supply further includes an inverter component 200 that receives the filtered DC current at a primary winding N1 of transformer 250. Secondary winding N2 of transformer 250 is connected after rectification to a low pass filter 260 of an inductance Lo and output capacitance Co forming the output circuit 275 of power supply 100. The output D.C. Voltage is developed in a similar manor as described with respect to FIG. 1.

In one non-limiting example, power supply 100 may include a Switching Power, Inc. Remo model ITT-150 Power Supply or model MD-10 KW (Switching Power Inc., Ronkonkoma N.Y. USA). Other switched regulated power supplies may benefit from the power factor correction circuit of the present invention.

The apparatus includes, more particularly, a power factor correction circuit 140 having a linear inductor and capacitor connected in a series between each respective phase of the source voltage and the corresponding phase of the power supply input. As shown in FIG. 3, the inductor L and capacitor C represents the embodiment of this structure with the inductor L having a winding arranged and adapted for electrical connection to capacitor C. In the embodiment shown in FIG. 3, connected between each line $105_A$, $105_B$ and $105_C$ of a respective a 3-phase line source and respective terminals $110_{A,B,C}$ forming input of power supply 100 receiving each line current are respective individual correction circuits $140_{A,B,C}$; correction circuit $140_A$ includes series connection of inductance L $101_A$ and capacitor C $102_A$; correction circuit $140_B$ includes series connection of inductance L $101_B$ and capacitor C $102_B$; and, correction circuit $140_C$ includes series connection of inductance L $101_C$ and capacitor C $102_C$.

In one embodiment, each inductance L and C values are designed and selected to attenuate the odd harmonics that otherwise distort the current $I_{AC}$ from the AC power line. That is, for example, harmonics attributable principally to the rectifier 150 and the capacitor filter 170 of the power supply 100. In the method, by proper selection of the value of inductance L and capacitance C, the odd harmonic currents may be reduced to less than approximately ten cent of their uncorrected value, e.g., at an AC power line frequency ranging from 57 to 63 HZ.

Figure 4:
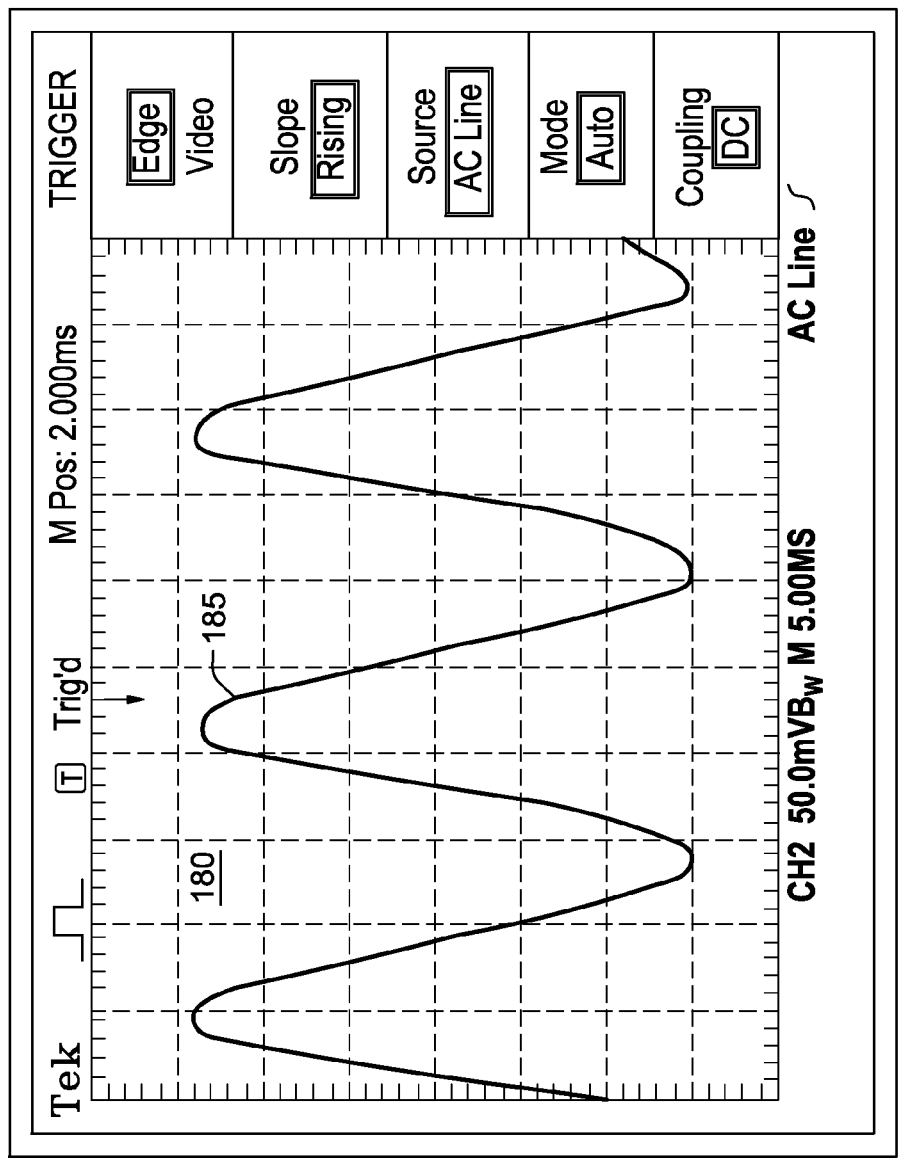

FIG. 4 illustrates a resultant waveform 180 of the corrected input line current due to incorporating power factor corrector circuit 140. Particularly, FIG. 4 shows the greatly improved generator line current 185 resulting from implementation of the power supply 100 having the harmonic current correction circuit 140 of FIG. 3, connected between the source and the power supply input terminals $110_A$, $110_B$, and $110_C$ for each phase. In the generator line current 185 shown in FIG. 4, total harmonic distortion of less than 10% is demonstrated.

In power supply operation using the embodiment of power supply 100 having power factor correction circuit 140 shown and described herein which, in one embodiment, comprises a linear current transformer, L, in series with a capacitor, C, at the front end input section of the power supply 100 for direct connection to the AC power line, there has been achieved a power factor improvement ranging from 20% to 30%. These improvements are achieved at least in part by the effect of this circuit 140 to enhance the input waveform to the power supply 100, reduce harmonics attributable to other circuitry within the power supply, and enhance the load demand.

With respect to the impedance presented by the power factor correction circuits to the AC signal source 120 for reducing harmonic current of each respective phase in the manner as described herein, the impedance introduced as a function of frequency is calculated as follows:

For a series R L C circuit as shown in FIG. 3, the series connection of inductor and capacitor, exhibits a magnitude of impedance (|Z|) according to:

$$|Z|=R+\omega Lj+1/(\omega Cj)$$

where $\omega L$ is the inductive reactance component ($|X_l|$) and $1/+C$ is the capacitive reactance component ($|X_c|$) of the impedance.

Impedance $|Z|=\sqrt{(R^2+(Xl-Xc)^2)}$ is present to current flow from the source. If $X_l=X_c$ then the loss due to line current flow at the fundamental frequency is $Iac^2*R$, and can be minimized by design. In one example embodiment, use of an inductor and capacitor near resonance but below the fundamental frequency achieves efficiency of greater than 99.5%, the |Z| being low at the generator fundamental frequency less than 1.0 ohm. While increasing |Z| with frequency reduces harmonic current amplitudes that would flow due to the power supply input rectifier 150 and bulk storage capacitor 170. The uncorrected line current, for each phase, can be represented by its Fourier Series as follows:

$$i_\vartheta(t) = \sum_{n=1,3,5,7,9}^{\infty} i(t)\sin(w_o nt + \vartheta)$$

where $i(t)=\int_0^{2\pi} i_1(t)\sin(w_o nt)$ are the Fourier coefficients; $I_{RMS}$ is the line current: $I_{RMS}=\sqrt{I_1^{2+}I_3^2+I_5^2+I_7^{2+}...+I_n^2}$; $I_1$=RMS value of fundamental current; and, the line current=$I_{RMS}=I_1$ when all harmonics are 0.

From the above equations, it is can be seen that the harmonic current is reduced as impedance to these higher frequency components is increased.

Thus, referring to FIG. 3, 140 circuit including Inductance L and C are designed and selected at a value calculated to attenuate the odd harmonics that otherwise distort the current IAC from the AC power line. The harmonics are attributable principally to the rectifier and the capacitor filter of the power supply 100. Particularly, by proper selection of the value of inductance L and C, the odd harmonic currents may be reduced to less than approximately ten cent of their uncorrected value.

This results in an input current to the power supply 100 having a virtually distortion free sinusoidal characteristic.

The correction circuit 140 exploits the constant efficiency characteristics of the switching regulator power supply load. The product of line current and line voltage is constant, and, consequently, the input current is greatest at low line voltage. At the same time the voltage drop across the inductor winding is at a maximum. Nevertheless, the choice of resonance for the circuit 140 ranging from between 0.91 and 0.94 of the fundamental source frequency, assures that less than 1% of the line range is sacrificed, to produce a power factor of 0.98 or better. Also, the impedance of this circuit 140 increases as above for all harmonics and results in less than 10% total harmonic content in the corrected source line current.

More particularly, the capacitor of the power factor correction circuit is selected to have a value suitable to provide the reactive power (volt amperes) demanded by the load presented by power supply 100. The circuit voltage drop V1 which is proportional to its impedance at the power line frequency (i.e., the demand current of the load represented by the power supply 10) is Iac*|Z| at the fundamental source frequency. With the inductive reactance=$X_l$ and the capacitance reactance=$X_c$, and with $X_l$–$X_c$ approaching zero, the voltage drop is Iac*R where R is essentially the loss in L.

An efficiency of 99.5% with loss of less than 1% of the operating line range of the power supply 100 have been achieved with the correction circuit 140 configured in or operable with power supply, while producing a power factor of 0.98 for the power supply 100.

Using the power factor correction circuit 140 of the present invention with a switching dc power supply, e.g., Switching Power, Inc. Remo model ITT-1500S power supply. The supply tested was loaded to 7.5 KW at 480V AC at 60 HZ. Data was recorded with and without the configuration of circuit present.

Table 1 illustrates performance of ITT-1500S Power Supply without the present power factor correction circuit 140 according to one example, and particularly provides example data representing various AC Line Voltage VOLTS and corresponding AC Line Current AMPS, a percent of total harmonic current; and, the resultant power factor achieved:

TABLE 1.0

ITT-1500S Power Supply Without The Present Invention
7.5 KW load, Efficiency = 85.4%

| AC Line Voltage VOLTS | AC Line Current AMPS | Total Harmonic Current (%) | Power Factor |
|---|---|---|---|
| 430 | 13.2 | >55 | 0.79 |
| 480 | 12.8 | >58 | 0.78 |
| 530 | 12.4 | >64 | 0.75 |

Table 2 illustrates performance of an ITT-1500S Power Supply incorporating or otherwise used with the present power factor correction circuit 140 according to one example, and particularly provides example data representing various AC Line Voltage VOLTS and corresponding AC Line Current AMPS, a percent of total harmonic current; and, the resultant power factor achieved:

TABLE 2

ITT-1500S Power Supply With The Present
Invention 7.5 KW load, Efficiency = 85.1%

| AC Line Voltage VOLTS | AC Line Current AMPS | Total Harmonic Current (%) | Power Factor |
|---|---|---|---|
| 430 | 8.9 | 9.1 | 0.99 |
| 480 | 8.3 | 9.5 | 0.98 |
| 530 | 7.9 | 9.8 | 0.98 |

In a further aspect, the inductor L and capacitor C values of the power factor correction circuit 140 are selected to provide: a low real power loss (i.e., less than 0.1% of total power loss) to the power supply line operation, while providing high impedance (Xl–Xc) to harmonic currents otherwise present, e.g., odd harmonic frequencies of the power source, thereby increasing the power factor while maintaining low voltage drop loss at the fundamental frequency current flow from the three-phase source to the power supply. Thus there is obtained less the 10% harmonic current content in the source current when in place with the power supply, while achieving, power factor improvement to 0.98, with loss of the power supply operating voltage range of less than 1%, while obtaining efficiency of better than 99.5% for the inductance capacitor art.

In addition, the characteristic impedance of said art is adjusted so as to get an overall: critically or over damped transient response. The source line current with the power factor correction circuit in place also experiences a line current phase shift on a cycle by cycle basis; this greatly improves the source loading for power supply load transients, e.g., as often experienced in radar transmitter power supplies. Instantaneous load changes produces large magneto-motive forces, which in turn can damage the rotor bearings of source generators and high harmonic current content is responsible for low generator life.

The inductor and capacitor circuit values may further be selected to provide a resonant frequency set below the lowest frequency of source operation, wherein a setting ranges from between 0.91 and 0.94 the lowest frequency of source operation.

Advantageously, the harmonic input current reduction and power factor correction circuit for three phase, power supplies provides a simpler, lower cost circuit alternative for enhancing power factor in an uncorrected electronic voltage power supply.

Although a few examples of the present invention have been shown and described, it would be appreciated by those skilled in the art that changes might be made in these embodiments without departing from the principles and spirit of the invention, the scope of which is defined in the claims and their equivalents.

What is claimed is:

1. A passive power factor correction circuit for a non-power factor corrected AC to DC power supply that receives 3-phase current from a connected 3-phase AC power source, said power supply having respective inputs associated with phase, said correction circuit comprising:

a linear inductor having an inductance and, a capacitor having a capacitance, with said inductor having a winding arranged and adapted for electrical connection in series with said capacitor, a separate said passive power factor correction circuit connecting a respective phase of said connected 3-phase AC power source and its respective associated power supply input-with no other active semiconductor power nor control switching components in operative combination with each separate passive power factor correction circuit, said inductance in combination with said capacitance of values reducing odd harmonic frequency current components from the line current drawn by said power supply in response to a load being placed on said AC to DC power supply, said inductance in combination with said capacitance having values that set said resonant frequency within a range from between 0.91 and 0.94 of a lowest frequency of said 3-phase current; and wherein said power supply draws less the 10% harmonic current content in said 3-phase current while achieving a power factor value of about 0.98 at less than about 1% loss in line operating input voltage.

2. The passive power factor correction circuit as claimed in claim 1, wherein said inductance in combination with said capacitance have values selected to provide a low real power loss to said connected 3-phase AC power source, while providing high impedance to harmonic currents of the connected 3-phase AC power source.

3. The passive power factor correction circuit as claimed in claim 2, wherein said high impedance reduces said odd harmonic frequencies.

4. The passive power factor correction circuit as claimed in claim 2, wherein said high impedance is provided to said odd harmonic frequency current components.

5. The passive power factor correction circuit as claimed in claim 2, wherein said connected 3-phase AC power source includes a current component at a fundamental frequency, said inductance in combination with said capacitance of values achieving a power factor increase while maintaining low voltage drop loss of said fundamental frequency current component.

6. The passive power factor correction circuit as claimed in Claim 5, wherein said power supply achieves an efficiency of greater than 99.5%.

7. The passive power factor correction circuit as claimed in claim 2, wherein said inductance in combination with said capacitance have values selected to provide a circuit characteristic impedance adapted to provide one of: a critically or over damped transient response.

8. The passive power factor correction circuit as claimed in claim 1, wherein said 3-phase current from the connected 3-phase AC power source is at a frequency of about 50 Hz or 60 Hz.

9. An AC to DC power supply apparatus comprising:
a non-power factor corrected AC to DC power supply that receives 3-phase current from a connected 3-phase AC power source and generates DC current output, said power supply having a respective input terminal associated with each phase for receiving line current of said phase;
a separate passive power factor correction circuit associated with each respective phase, each said separate correction circuit including a linear inductor having an inductance and, a capacitor having a capacitance, with said inductor having a winding arranged and adapted for electrical connection in series with said capacitor, each said separate passive power factor correction circuit connecting a respective phase of said connected 3-phase AC power source and a respective power supply input terminal with no other active semiconductor power nor control switching components in operative combination with each said separate passive power factor correction circuit;
said inductance in combination with said capacitance of values reducing odd harmonic frequency current components from the line current drawn by said power supply in response to a load being placed on said AC to DC power supply, said inductance in combination with said capacitance having values that set said resonant frequency within a range from between 0.91 and 0.94 of a lowest frequency of said 3-phase current; and
wherein said power supply draws less the 10% harmonic current content in said 3-phase current while achieving a power factor value of about 0.98 at less than about 1% loss in line operating input voltage.

10. The AC to DC power supply apparatus as claimed in claim 9, wherein said inductance in combination with said capacitance have values selected to provide a low real power loss to said connected 3-phase AC power source, while providing high impedance to odd harmonic frequencies to thereby reduce current flow of odd harmonic frequencies from the power source.

11. The AC to DC power supply apparatus as claimed in claim 10, wherein said connected 3-phase AC power source includes a current component at a fundamental frequency, said inductance in combination with said capacitance of values achieving a power factor increase while maintaining low voltage drop loss of said fundamental frequency current component.

12. The AC to DC power supply apparatus as claimed in Claim 9, wherein said power supply achieves an efficiency of greater than 99.5%.

13. The AC to DC power supply apparatus as claimed in claim 9, wherein said inductance in combination with said capacitance have values selected to provide a circuit characteristic impedance adapted to provide one of: a critically or over damped transient response.

14. The AC to DC power supply as claimed in claim 9, wherein said 3-phase current from the connected 3-phase AC power source is at a frequency of about 50 Hz or 60 Hz.

15. A method for improving power factor of a non-power factor corrected AC to DC power supply that receives 3-phase current from a connected 3-phase AC power source, said power supply having respective inputs associated with phase, said method comprising:
providing, for each phase, a separate passive correction circuit including a linear inductor having an inductance and a capacitor having a capacitance, with said inductor having a winding arranged and adapted for electrical connection in series with said capacitor, said inductor and capacitor having values selected for reducing odd harmonic frequency current components from the line current drawn by said power supply in response to a load being placed on said AC to DC power supply, and said inductance in combination with said capacitance having values that set said resonant frequency within a range from between 0.91 and 0.94 of a lowest frequency of said 3-phase current, and wherein said power supply draws less the 10% harmonic current content in said 3-phase current while achieving a power factor value of about 0.98 at less than about 1% loss in line operating input voltage;
and
connecting said circuit between each respective phase of said connected 3-phase AC power source and a respective power supply input associated with each respective phase with no other active semiconductor power nor control switching components in operative combination with each said separate passive correction circuit.

16. The method as claimed in claim 15, wherein said power factor value for said AC to DC power supply of about 0.98 at less than about 1% loss in line operating input voltage range is at an overall efficiency of greater than about 99.5%.

17. The method as claimed in claim 15, wherein said 3-phase current from the connected 3-phase AC power source is at a frequency of about 50 Hz or 60 Hz.

* * * * *